US012346337B1

(12) United States Patent
Palatnik de Sousa et al.

(10) Patent No.: US 12,346,337 B1
(45) Date of Patent: Jul. 1, 2025

(54) ADVANCED HYBRID SEARCH SYNTAX FOR POWER USER CONTENT RETRIEVAL

(71) Applicant: Dell Products L.P., Round Rock, TX (US)

(72) Inventors: Iam Palatnik de Sousa, Rio de Janeiro (BR); Paulo Abelha Ferreira, Rio de Janeiro (BR); David Burth Kurka, Campinas (BR); Karen Braga Enes, Belo Horizonte (BR); Pedro Fratini Chem, Porto Alegre (BR); Vicente J. P. Amorim, João Monlevade (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/642,558

(22) Filed: Apr. 22, 2024

(51) Int. Cl.
*G06F 16/245* (2019.01)
*G06F 16/2457* (2019.01)

(52) U.S. Cl.
CPC .............................. *G06F 16/24578* (2019.01)

(58) Field of Classification Search
CPC ............................................... G06F 16/24578
See application file for complete search history.

(56) References Cited

PUBLICATIONS

Improving information retrieval in the Elastic Stack: Hybrid retrieval | Elastic Blog. https://www.elastic.co/blog/improving-information-retrieval-elastic-stack-hybrid.
Improve search relevance with hybrid search, generally available in OpenSearch 2.10 • OpenSearch. https://opensearch.org/blog/hybrid-search/.
Help:CirrusSearch—MediaWiki. https://www.mediawiki.org/wiki/Help:CirrusSearch.
Refine Google searches—Google Search Help. https://support.google.com/websearch/answer/2466433?hl=en.
Apache Lucene—Query Parser Syntax. https://lucene.apache.org/core/2_9_4/queryparsersyntax.html.

*Primary Examiner* — Truong V Vo
(74) *Attorney, Agent, or Firm* — Workman Nydegger

(57) ABSTRACT

One example method includes enabling a user to define a query that comprises a hybrid search syntax (HSS), and the HSS is in the form of a single string that comprises a lexical component and a semantic component, receiving the query from the user, parsing the lexical component and the semantic component into respective groups of one or more sub-components, performing a lexical search based on the sub-components of the lexical component, and performing a semantic search based on the sub-components of the semantic component, ranking, separately from each other, results of the lexical search and results of the semantic search, combining the results of the lexical search and the results of the semantic search to create aggregate results, and re-ranking the aggregate results.

20 Claims, 5 Drawing Sheets

ADVANCED HYBRID SEARCH SYNTAX FOR POWER USER CONTENT RETRIEVAL

COPYRIGHT AND MASK WORK NOTICE

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

TECHNOLOGICAL FIELD OF THE DISCLOSURE

Embodiments disclosed herein generally relate to content query definition and execution. More particularly, at least some embodiments relate to systems, hardware, software, computer-readable media, and methods, for the definition and use of a hybrid search syntax that is agnostic with respect to the search services that may underlie a query to be performed using the hybrid search syntax.

BACKGROUND

Retrieving content based on relevance/similarity is a feature of the so called 'Retrieval Augmented Generation' (RAG), which is the information retrieval method employed in most chat bot type applications in the current wave of Large Language Models (LLM). As RAG has become more popular however, its limitations have also become clearer. Notably, semantic search alone is not enough to always retrieve the most relevant content and, accordingly, some efforts have been directed to hybrid search techniques. However, the typical pipeline of deploying a hybrid search solution requires a number of steps that make it very difficult for an end user to easily control the parameters of the search. For example, in order to use a common stack for hybrid search, such as combining Elastic Search for lexical retrieval and a Vector Database for semantic, the user would typically be limited to a fixed user interface with access to only some of the parameters of the lexical and hybrid search engines, with few options to control, in depth, how these two searches are being combined onto the final list of results. This also typically further necessitates the user becoming acquainted with how the search solutions are implemented on the back-end and the various nuances of a particular type of lexical or semantic search service.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1A:
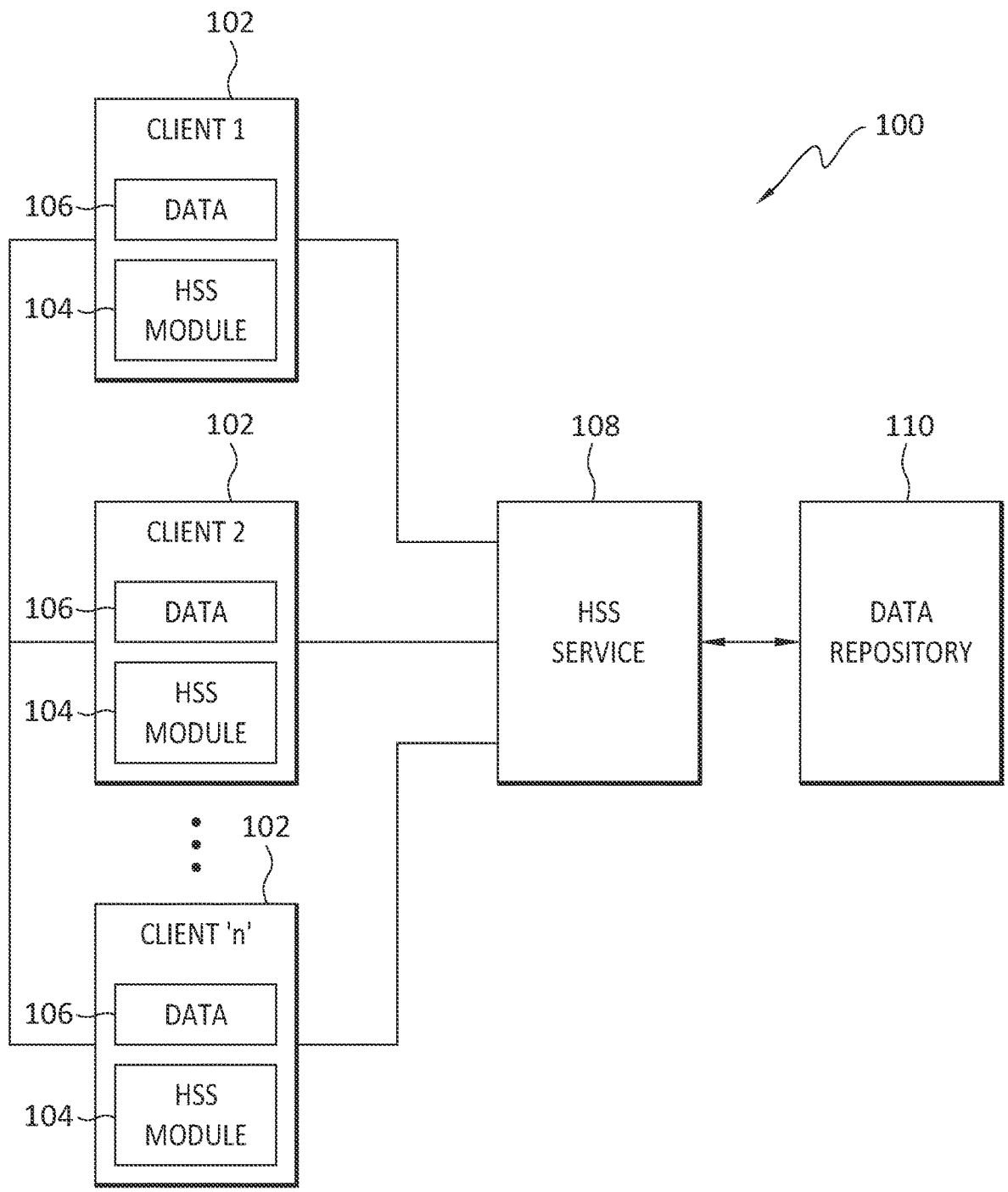
FIG. 1a discloses aspects of an example operating environment for an embodiment.

Embodiments disclosed herein generally relate to content query definition and execution. More particularly, at least some embodiments relate to systems, hardware, software, computer-readable media, and methods, for the definition and use of a hybrid search syntax that is agnostic with respect to the search services that may underlie a query to be performed using the hybrid search syntax.

One example embodiment comprises a method for using a hybrid search syntax to retrieve content. The method may be agnostic as to the underlying search services that are used to implement a query of one or more different modes of content. In one embodiment, the method comprises the operations: generating a hybrid query that includes a lexical component and a semantic component; based on the hybrid query, automatically invoking one or more underlying search services corresponding to the hybrid query; by the search services, performing a lexical search, and performing a semantic search; receiving from the search services, respective ranked results; re-ranging the results using one or more user-specified weights; and, outputting a hybrid result ranking.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that a hybrid search query may be defined and employed by a user without requiring the user to have specific knowledge or skills with respect to the use of underlying, or backend, search services called by the hybrid search query. An embodiment may enable the swapping of different backed search services without requiring a user to employ a new or different syntax to define a hybrid search query for using those search services. An embodiment may enable a user to use the same syntax for a hybrid search query, notwithstanding that the backend services called by the hybrid search query may differ over time. Various other advantages of one or more example embodiments will be apparent from this disclosure.

A. ASPECTS OF AN EXAMPLE OPERATING ENVIRONMENT FOR ONE EMBODIMENT

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, operations that comprise defining and/or using a hybrid search query that may comprise a lexical component, and a semantic component. More generally, the scope of this disclosure embraces any operating environment in which the disclosed concepts may be useful. In an embodiment, a hybrid search query may be used to find, and return, various types of content including, but not limited to, text data, audio data, video data, image data, and any combination of such data. It is noted that as used herein, the term 'data' is intended to be broad in scope. Example embodiments are applicable to any system capable of storing and handling various types of objects, in analog, digital, or other form.

With particular attention now to FIG. 1a, one example of an operating environment for embodiments is denoted generally at 100. In general, the example operating environment 100 may comprise one or more clients 102, each of which may host a respective instance of a hybrid search syntax (HSS) module 104. The HSS module 104 of a given client 102 may be used to search one or more data repositories 106 of that client 102.

In an embodiment, the clients 102 may communicate with an HSS service 108 that may be hosted in a cloud site, or on premises at an enterprise site. For example, the clients 102 may access the HSS service 108 to define, and run, queries directed to a data repository 110. Where a client 102 has access to the HSS service 108, that client 102 may, but is not required to, omit the HSS module 104. In an embodiment, a client 102 may use the HSS module 104 and/or the HSS service 108 to access the data repository 110. In an embodiment, a client 102 may use the HSS module 104 to access only the local data repository 106. In an embodiment, a client 102 may use the HSS module 104 and/or the HSS service 108 to access the local data repository 106 and/or the data repository 110.

In any case, and more generally, query results may be returned from a data repository to an HSS entity. Such query results may comprise content, of various types, that has been retrieved, using a hybrid query, from a data repository. In general, the HSS module 104 and HSS service 108 may perform any of the disclosed methods, processes, and operations, with respect to the definition, use, and modification, of a hybrid search query.

B. CONTEXT FOR AN EXAMPLE EMBODIMENT

There are a variety of different search syntax approaches for the lexical/key-word search case. In general, these approaches employ similar functionalities, including exact matches, metadata filters and fuzzy matching, even if the exact way to write queries varies a bit between them. However, all of these approaches focus only on the lexical/key-word/semantic case, and do not consider the more recent world of semantic search which greatly enables RAG applications. Thus, and as discussed below, by creating a syntax for hybrid search which covers both lexical and semantic searches, an embodiment may better serve modern AI (artificial intelligence) applications that depend on RAG or hybrid search in general.

B.1 Vector Embeddings

Data of various types may be represented as vectors with continuous real values. In particular, this is frequently used for text and image data, in order to enable AI models to learn how to operate with those representations. These learned vectors are often called 'vector embeddings' or simply 'embeddings,' and enable models to group inputs together in the embedding space when those are inputs are similar to each other. One advantage of such embeddings is that they allow for quantification of similarity in a way similar to what humans would consider 'similar meanings.' For example, although the strings 'yes' and 'affirmative' have very different characters, they are synonyms in regards to their meaning, and their vectors embeddings would be similar in the embedding space of a language model trained with English texts.

B.2 Semantic Search

In its most basic form, semantic search refers to a comparison between embedding vectors, in which a query vector is compared against a database of vectors and the results are ranked by similarity. When the number of vectors involved fits in the memory of a computer, the similarity may be computed as cosine-similarity between the vectors, and the best match can be found quickly. However when the number of vectors is too large to fit in memory, or too computationally costly to find directly by this method, these embeddings may be indexed with other vector formats, and an approximated search performed, such as an approximate-nearest-neighbors search. This is the principle behind most vector database services, but even then the starting point of the semantic search algorithm is always the embeddings generated from the user data, that is, both the query and the database of possible matches.

B.3 Fuzzy Matching

Fuzzy matching is a technique that may be used to make non-exact matches between keywords but, in contrast with a semantic search approach, fuzzy matching only considers the literal strings and characters themselves, and not their semantic meaning. For example, the strings 'artificial intelligence research' and 'researchers of Artificial Intelligence' have similar lexical contents, despite the different word orders and different capitalizations. A fuzzy matching system would easily match these to one another.

B.4 Hybrid Search Intuition

The strings 'mouse', 'mousse' and 'moose' are all very similar in lexical content, with nearly identical characters, despite having very different meanings. Further, the strings 'mouse,' 'mice,' and 'rat' are very different lexically, despite having very similar semantic meanings. For certain use cases, it might be apparent whether a more lexical matching or semantic matching is best, but generally speaking, having a flexible retrieval method, as exemplified in one example embodiment, that can leverage both matching types and weight them according to the needs of the user may be the best approach, as it draws from the respective strengths of both methods. While information retrieval has historically been heavily reliant on lexical matching, the advent of modern language models and better hardware has made semantic matching much more viable, meaning that powerful hybrid search retrieval, as employed in one example embodiment, is now feasible as a component of products and applications.

C. OVERVIEW OF ASPECTS OF AN EXAMPLE EMBODIMENT

Retrieving content by relevance/similarity is a key functionality in a vast number of applications, from general search engines to recommendation systems to document retrieval, among others. Two key approaches for searching for relevant content include keyword search, sometimes also called syntactic or lexical search, and semantic search. The former focuses on exact or fuzzy matching of specific terms to the target items to be retrieved, while the latter focuses on comparisons between dense vectorized representations in an embedding space, using cosine-similarity for example.

In simple terms, syntactic search involves searching for pieces of text that have similar words or sequences of characters, whereas a semantic search can match pieces of text that have completely different words, as long as those pieces of text have similar meanings. For example, a query for 'mouse' with a syntactic search would not retrieve the word 'rat' since 'mouse' and 'rat' have quite different spellings. On the other hand, a semantic search might retrieve 'rat' since a rat is similar to a mouse.

One way to enable semantic search is to map the text into a topological space, creating the so-called embeddings. In this space, the notion of distance is well defined and measurable, and it is possible to place text with similar semantic meaning on nearby regions, enabling searches. Recently, the advent of better AI models has created more representative embeddings that allow for more nuanced and semantically rich similarity searches. Notably, not only this has enabled more semantic search applications to flourish, but it also made hybrid search approaches more common.

In a hybrid search, both keyword and semantic search are combined either by the union of the respective search results of each method, or by some form of filtering such as metadata filtering. For example, search results for the query 'federated learning' in a database of documents may include the results of a lexical search like Elastic Search, combined with the results of a vector embedding search. In this illustrative example, Elastic Search finds more literal matches with similar keywords and characters, while the embedding search finds entries with similar meanings even if the words are different. Metadata filtering may be performed to filter results by parameters such as date, file-type, size, or origin.

In the realm of keyword search solutions, some approaches may provide users with an advanced syntax, such as for a lexical search for example, in case the user wants more fine-grained control of the matching and filtering of results from that particular search. This is the approach used in applications such as Wikipedia, JIRA, and Windows explorer.

At present however, there are no known approaches for implementing such an advanced search syntax in the hybrid search context. That is, while a conventional approach may be 'hybrid' in the sense that multiple syntax statements are used to obtain respective results, which may then be combined in some manner, such an approach contrasts with an example embodiment at least in that, in an example embodiment, a single hybrid syntax statement is used to obtain results. Further, in a conventional approach, the user is required to know/learn the specific respective syntaxes for each different search service that is to be employed while, in an embodiment, no such knowledge is required on the part of the user since a hybrid syntax statement according to an embodiment is generic, or agnostic, as to all search services expected to be used. As well, a hybrid search syntax according to an embodiment enables a user to achieve fine grained control over each of the different searches, on a per-search type basis, implied by the hybrid syntax statement.

Thus, an embodiment may comprise a tool more easily usable by users that stand to benefit from the various content retrieval approaches. This can potentially be deployed on any system that uses keyword searches to semantically enrich the results. Thus, one example embodiment comprises the aforementioned functions and capabilities.

In more detail, one example embodiment comprises a power user syntax for hybrid searches that makes hybrid search easier and service-agnostic to the end user. With a unified query syntax, the user can make powerful requests on a single string, which get appropriately mapped to the various elements of the respective lexical and semantic search backends automatically. In one use case, a power user might be a RAG system developer looking to enhance the capabilities of their RAG dependent language model application.

D. DETAILED DISCUSSION OF ASPECTS OF AN EXAMPLE EMBODIMENT

D.1 Introduction

One example embodiment comprises the definition and use of an advanced search query that may be represented by both a keyword query, which in the following example is enclosed in square brackets [ ], and a semantic query, which is enclosed in angle brackets < >:

[Keyword query]:w1 <Semantic query>:w2 where w1 and w2 are weights which may be defined by a user, which may be normalized when re-ranking the combined result.

In an embodiment, an HSS module or application, for example, may define and parse this search query, and may trigger the performance of two parallel searches, namely, a keyword search, and a semantic search, each with its own respective set of parameters. When the results are retrieved, possibly also by the HSS module or application, the results may be combined, again by an HSS module for example, in a single list.

In an embodiment, the keyword search part of the query may use existing open-source implementations of a keyword search syntax, such as fuzzy matching, exact matching, filetype search, and/or, metadata searches. In an embodiment, the semantic search part of the query supports all relevant parameters for semantic search, and also metadata filters that can be semantically defined, for instance. In one embodiment, respective results of the keyword search and the semantic search may be combined using rank fusion techniques, such as the Reciprocal Rank Fusion approach disclosed in "Improving information retrieval in the Elastic Stock: Hybrid retrieval/Elastic Blog" ("Hybrid Retrieval"), which is incorporated herein in its entirety by this reference.

For example, consider a system that stores a series of studies and projects that have titles, descriptions, dates, among other such metadata, such as JIRA, Confluence, and Sharepoint, for example. In an embodiment, a sample query in this case might look like:

[artifact:*.ppt+OCTO-*+vector]:1+<author:'French surname' date:'summer months' safety in edge devices>: 1.5

Breaking this example query down by parts, this query may be understood as follows:

Keyword parameters:
artifact:*.ppt—only look for entries with artifact metadata of the type 'power point file'
+OCTO-*—look for documents that contain expressions starting with the substring 'OCTO-'
+vector—additionally, look for documents containing the word 'vector' Semantic parameters:
author:French surname (look for entries where the author names include a French surname)
date:summer months (look for entries that were published in the summer safety in edge devices (look for entries that semantically match the content of this sentence).

This example query reflects the idea that a given user might remember some aspects of the desired document better and other aspects more 'fuzzily,' that is, with less accuracy and/or precision. For example, the user might remember that one of the authors had a French surname, and this could be understood by a semantic vector search. Similarly, the user might remember that the document was initially published somewhere in the "summer time," without specifically remembering which month, and a semantic search could, at least in principle, make this semantic connection between the date field and these more abstract and vague human language queries. The user might also remember that the document was somewhat related to the topic of safety on edge devices, without remembering specifically what keywords were related to this in the document.

In one embodiment, the weight values used may be divided by the total weight in order to be normalized. The idea of passing weights in arbitrary values like this is that it gives users the freedom of arbitrarily giving more, or less, emphasis to the keyword or semantic aspects of the query, without having to be concerned about the normalization of such weights.

D.2 Example Features and Aspects of an Embodiment

As will be apparent from this disclosure, one or more embodiments may possess various useful features and aspects, although no embodiment is required to possess any of such features and aspects. The following examples are illustrative, but not exhaustive.

An embodiment may define and employ a so-called 'power user' hybrid search syntax. For example, a hybrid search syntax (HSS) according to one embodiment may comprise, in addition to a lexical search component, a semantic search component. As a hybrid search may be the best available approach for content retrieval, by giving users the option to perform the hybrid search more easily, an embodiment may significantly improve the user experience, as well as the quality of search results obtained using an HSS syntax.

An embodiment may enable, and perform, multimodal data retrieval. That is, an embodiment may be applicable to multimodal searches, which may be particularly useful, as multimodal embeddings are becoming increasingly common. Thus, an embodiment may be readily be extended to, and employed with, databases that include, but are not limited to, audio, video, images, and combinations of these data types.

An embodiment may be agnostic as to the search service(s) employed in connection with an HSS syntax. That is, an embodiment may be agnostic as to the particular lexical and semantic search services running in the backend. This means that, in an embodiment, the user is not required to learn the specifics of how a lexical search or a semantic search is performed on those search services, such as ChromaDB, Milvus, or Weaviate for example, and can simply use the same generic syntax without regard to which search services are used on the backend. That is, in an embodiment, an HSS is accordingly translated onto those backends automatically. In an embodiment, the particular search service(s) used to service a query may be transparent to a user. In an embodiment, a user may specify one or more particular search services to be used to service a query. In an embodiment however, the HSS syntax does not change, regardless of which service(s) are invoked, or how those services are selected. Thus, a user may, in an embodiment, flexibly define a group of search services to be used, and may invoke those search services using a single consistent HSS syntax.

Figure 1B:
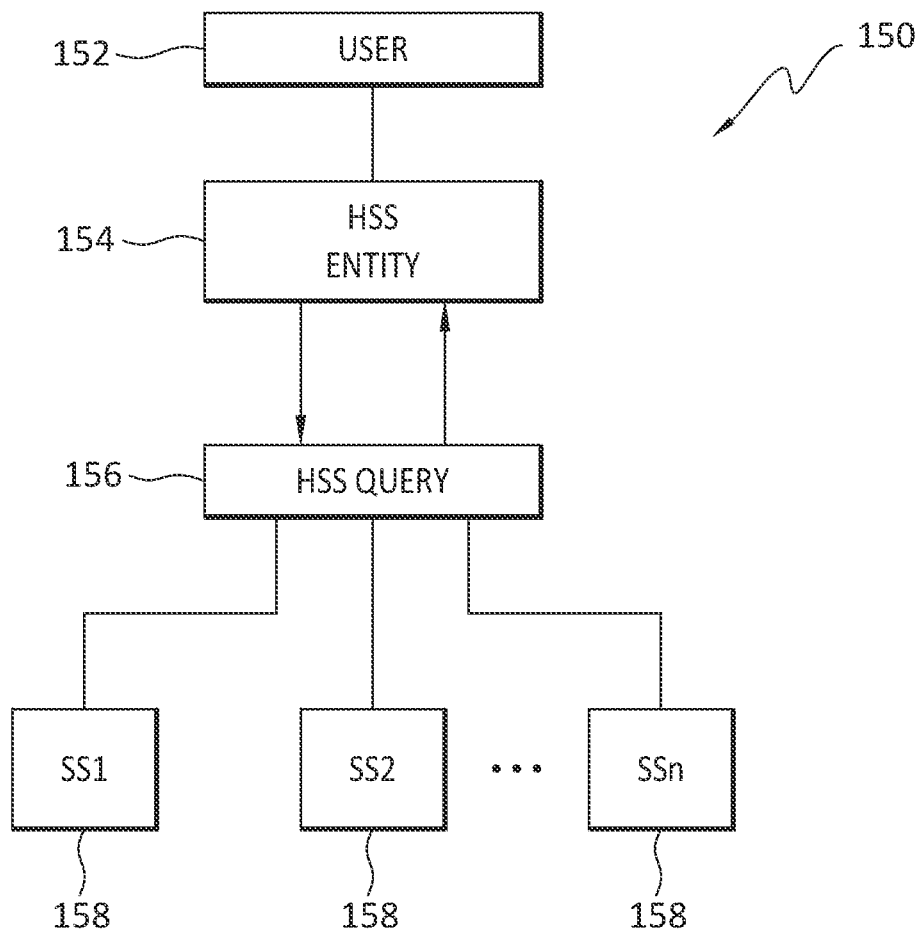
FIG. 1b discloses aspects of an example architecture according to one embodiment.

With reference briefly now to the example of FIG. 1b, details are provided concerning an architecture 150 according to one embodiment. As shown there, a user 152 may use an HSS entity 154 to define an HSS query 156 having an HSS syntax such that when the HSS query 156, when instantiated, operates to automatically invoke the use of one or more different search services 158. Regardless of the type, or combination, of search services 158 invoked and employed however, an embodiment may nonetheless use the same HSS syntax for any search involving any of those search services 158.

D.3 Discussion

D.3.1 Example Method

Figure 2:
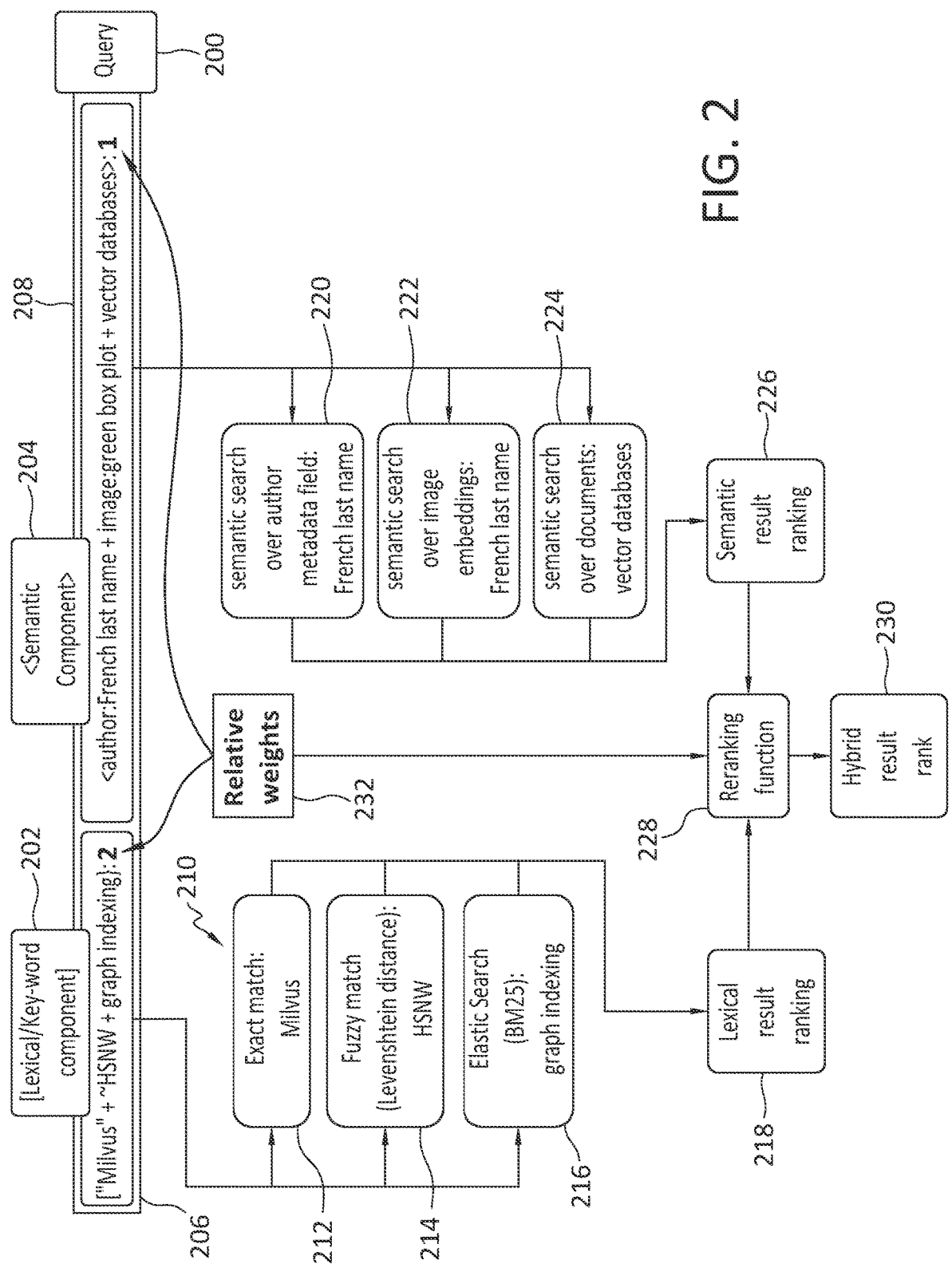
FIG. 2 discloses aspects of an example architecture according to one embodiment.

FIG. 2 discloses an example query 200 comprising an HSS syntax, according to one embodiment. More specifically, FIG. 2 discloses how, according to one embodiment, the query 200 with one or more lexical components 202 and one or more semantic components 204 may be broken down into respective sub-components 206 and 208. FIG. 2 also discloses, according to one embodiment, some possible backend search services 210 that may be associated with some of the sub-components. In an embodiment, such backend search services may comprise, but are not limited to, one or more of Fuzzy matching 212 with Levenshtein distance, Elastic Search 214 using BM25, and Milvus 216 exact searching. Any one, or more, of these backend search services 210 may be substituted with another back-end search service, without requiring any change to the HSS syntax of the query 200.

Upon instantiation of the query 200, the lexical component 202 may cause one or of the more backend search services 210 to be automatically invoked to perform lexical sub-component searches. For example, the search services 210 may be invoked as specified in the lexical component 202. Each of these search services 210 may generate and output respective results which may then be used to generate a lexical result ranking 218.

With continued reference to the example of FIG. 2, and upon instantiation of the query 200, a respective semantic search 220, 222, and 224, may be automatically invoked and performed regarding respective sub-components 208 of the semantic component 204. Each of these semantic searches 220, 220, and 224, may generate and output respective results which may then be used to generate a semantic result ranking 226.

Next, the semantic result ranking 226 and the lexical result ranking 218 may be combined, and a reranking function 228 invoked to generate a final ranking, or hybrid result rank 230. In an embodiment, the reranking performed by the reranking function 228 may be weighted by the user defined weights 232, which may be initially defined as part of the query 200. If no weights 232 are defined for the query 200, both the lexical result ranking 218 and the semantic result ranking 226 may be assigned, or receive, the same weight. In either case, the hybrid result rank 230 may be provided to the user.

It is noted that while FIG. 2 discloses, for example, search services 210 such as 'Levenshtein Distance' for the fuzzy matching computations, a fuzzy matching function could be changed or replace without necessitating any changes in the HSS syntax embodied in the query 200. Thus, a change regarding a search service 210, such as the replacement of a search service 210 with a new/modified search service, would not require the user to learn a new way to write queries for utilizing the new search service, nor would require the user to learn how to write queries for each possible individual backend.

D.3.2 Lexical Queries

While this disclosure does not comprise an exhaustive set of features to be included in lexical or semantic queries, as these could be expected to be use-case dependent, a common set of such features, according to one example embodiment, might comprise:
- exact literal matching—forcing the results to contain a string exactly as written in the query, for instance by encasing it in quotation marks "as such";
- fuzzy literal matching—forcing the results to have a high degree of literal matching, although not demanding it to be exactly perfect—one method of fuzzy matching involves using Levenshtein distance to determine similarity/matching, and fuzzy matching may be indicated in the query by a~character, for instance;
- regex (regular expression) patterns; and
- wildcard patterns, such as 'OCTO-*' for example, indicating that any patterns starting with 'OCTO-' should be retrieved—wildcards like this are a special case of regex.

D.3.3 Semantic Queries

For semantic queries, besides the semantic search of the main query itself, another useful set of feature is to allow for semantic queries to be performed on metadata and multimodal fields. Typically, a semantic search query may be matched against the title or content of documents only, but users may remember vague abstract details about metadata such as:
- author name—'English lastname,' where the semantic search would retrieve common English lastnames, in case the user forgot what the exact last name was;
- date—'close to Thanksgiving last year' can be translated by a language model to an appropriate date period; and
- images—'scatterplots with red dots' could be matched via semantic search to the content of images in the target documents.

It is noted that these are presented by way of illustration, and this does not constitute an exhaustive list. Rather, these examples are merely representative of some typically useful examples for generic RAG or search bar use cases.

D.3.4 Hybrid Re-Rank

The implementation of a hybrid re-rank, as shown in the example of FIG. 2 at 228/230, may be performed in various ways. One example embodiment may comprise and employ an adaptation of the Reciprocal Rank Fusion (RRF) formula disclosed in the Hybrid Retrieval document incorporated herein:

$$\text{score}_{Rerank}^d = w_{lexical}\left(\frac{1}{k + \text{rank}_{Lexical}^d}\right) + w_{semantic}\left(\frac{1}{k + \text{rank}_{Semantic}^d}\right)$$

Here, $w_{lexical}$ is comes from the weight attributed by the user to the lexical search, and $w_{semantic}$ comes from the weight attributed to the semantic component. The re-rank score for a given document d, or other collection or mode of data, may then be used to choose the best matching document as a fusion of both the lexical and semantic results.

E. EXAMPLE METHODS

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
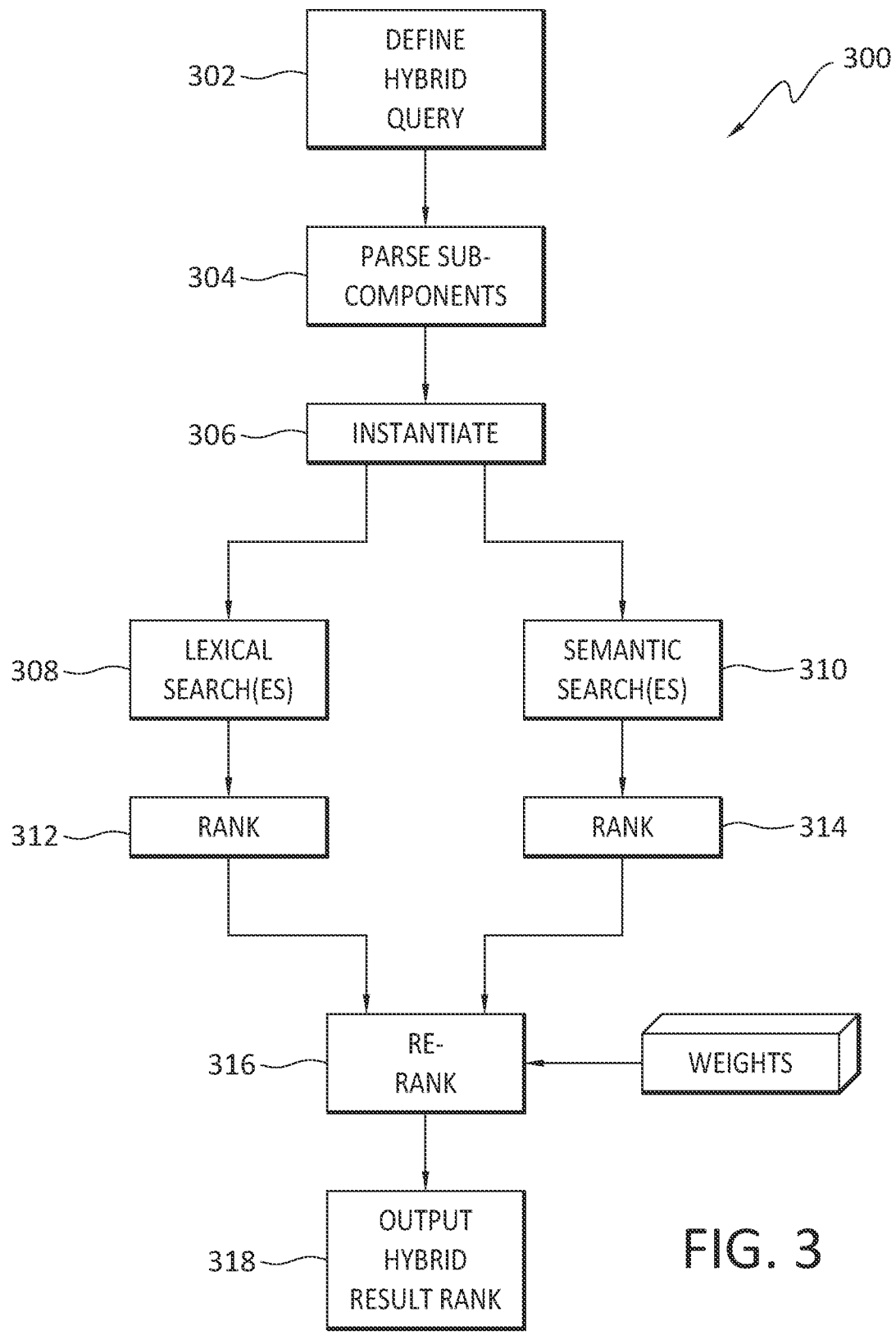
FIG. 3 discloses aspects of a method according to one embodiment.

Directing attention now to FIG. 3, a method 300 is disclosed according to one embodiment. In an embodiment, the method 300 may be performed in whole or in part by an HSS module at a client. In one embodiment, the method 300 may be cooperatively performed by a client and an HSS service. An HSS service may provide query functionality as-a-Service to one or more clients. An HSS service may be hosted at a cloud site, or other remote site, or on premises at an enterprise.

The example method 300 may begin when a user, possibly using a GUI (graphical user interface), CLI (command line interface), or other interface, defines 302 a hybrid query that may comprise one or more lexical components and one or more semantic components. The hybrid query may be retrievably stored so that a user can retrieve and execute the hybrid query on demand. In an embodiment, the hybrid query may be executed automatically according to a schedule and/or on an ad-hoc basis.

The hybrid query may be parsed 304 into sub-components, each of which may be the subject of either a lexical search, or a semantic search. In an embodiment, the parsing 304 may be performed as part of the instantiation 306. After the hybrid query is instantiated 306, such as by a user for example, one or more lexical searches may be performed 308, and one or more semantic searches may be performed 310. The performance 308 of the lexical search and the performance 310 of the semantic search may take place at the same time, at overlapping times, or at different times.

The respective results of the lexical search 308 and the semantic search 310 may then be ranked 312, 314. A re-ranking function may then be performed 316, possibly based on weights provided by a user as part of the hybrid query definition 302. For example, a more heavily weighted search result may be ranked higher than a less heavily weighted search result. The output of the re-ranking function 316 may be a list that comprises lexical search 308 results and semantic search 310 results, where all of these results are ranked according to their respective weights. The ranked list may then be output 318 to a user.

F. FURTHER EXAMPLE EMBODIMENTS

Following are some further example embodiments. These are presented only by way of example and are not intended to limit the scope of this disclosure or the claims in any way.

Embodiment 1. A method, comprising: enabling a user to define a query that comprises a hybrid search syntax (HSS), and the HSS comprises a lexical component and a semantic component; receiving the query from the user; parsing the lexical component and the semantic component into respective groups of one or more sub-components; performing a lexical search based on the sub-components of the lexical component, and performing a semantic search based on the sub-components of the semantic component; ranking, separately from each other, results of the lexical search and results of the semantic search; combining the results of the lexical search and the results of the semantic search to create aggregate results; and re-ranking the aggregate results.

Embodiment 2. The method as recited in any preceding embodiment, wherein the aggregate results are re-ranked using weights specified by the user.

Embodiment 3. The method as recited in any preceding embodiment, wherein the HSS is generic as to respective search services that were used to perform the lexical search, and the semantic search.

Embodiment 4. The method as recited in any preceding embodiment, wherein the sub-components of the lexical component comprise one or more lexical search parameters.

Embodiment 5. The method as recited in any preceding embodiment, wherein the sub-components of the semantic component comprise one or more semantic search parameters.

Embodiment 6. The method as recited in any preceding embodiment, wherein the HSS is unchanged notwithstanding replacement or modification of a search service used to perform the lexical search or the semantic search.

Embodiment 7. The method as recited in any preceding embodiment, wherein the aggregate results are returned to the user after the re-ranking is performed.

Embodiment 8. The method as recited in any preceding embodiment, wherein content corresponding to a portion of the aggregate results is retrieved and returned to the user.

Embodiment 9. The method as recited in any preceding embodiment, wherein content corresponding to a portion of the aggregate results comprises multimodal content.

Embodiment 10. The method as recited in any preceding embodiment, wherein the HSS is in a form of a single string.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform anyone or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 4:
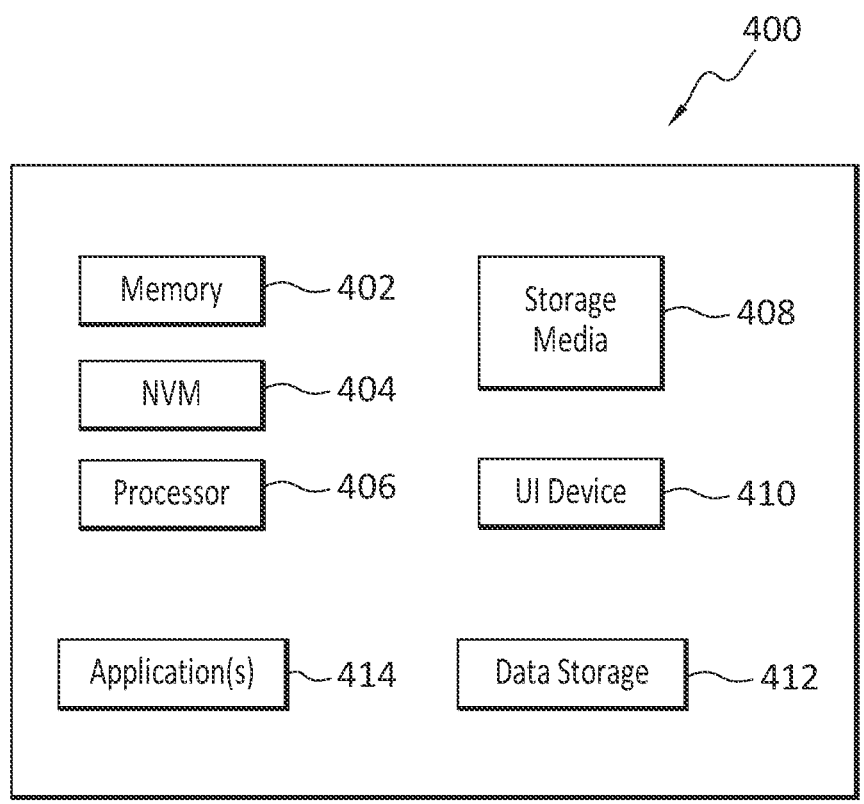
FIG. 4 discloses aspects of a computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method, comprising:
   enabling a user to define a query that comprises a hybrid search syntax (HSS), and the HSS comprises a lexical component and a semantic component;
   receiving the query from the user;
   parsing the lexical component and the semantic component into respective groups of one or more sub-components;
   performing a lexical search based on the sub-components of the lexical component, and performing a semantic search based on the sub-components of the semantic component;
   ranking, separately from each other, results of the lexical search and results of the semantic search;
   combining the results of the lexical search and the results of the semantic search to create aggregate results; and
   re-ranking the aggregate results.

2. The method as recited in claim 1, wherein the aggregate results are re-ranked using weights specified by the user.

3. The method as recited in claim 1, wherein the HSS is generic as to respective search services that were used to perform the lexical search, and the semantic search.

4. The method as recited in claim 1, wherein the sub-components of the lexical component comprise one or more lexical search parameters.

5. The method as recited in claim 1, wherein the sub-components of the semantic component comprise one or more semantic search parameters.

6. The method as recited in claim 1, wherein the HSS is unchanged notwithstanding replacement or modification of a search service used to perform the lexical search or the semantic search.

7. The method as recited in claim 1, wherein the aggregate results are returned to the user after the re-ranking is performed.

8. The method as recited in claim 1, wherein content corresponding to a portion of the aggregate results is retrieved and returned to the user.

9. The method as recited in claim 1, wherein content corresponding to a portion of the aggregate results comprises multimodal content.

10. The method as recited in claim 1, wherein the HSS is in a form of a single string.

11. A non-transitory storage medium having stored therein instructions that are executable by one or more hardware processors to perform operations comprising:
    enabling a user to define a query that comprises a hybrid search syntax (HSS), and the HSS comprises a lexical component and a semantic component;
    receiving the query from the user;
    parsing the lexical component and the semantic component into respective groups of one or more sub-components;
    performing a lexical search based on the sub-components of the lexical component, and performing a semantic search based on the sub-components of the semantic component;
    ranking, separately from each other, results of the lexical search and results of the semantic search;
    combining the results of the lexical search and the results of the semantic search to create aggregate results; and
    re-ranking the aggregate results.

12. The non-transitory storage medium as recited in claim 11, wherein the aggregate results are re-ranked using weights specified by the user.

13. The non-transitory storage medium as recited in claim 11, wherein the HSS is generic as to respective search services that were used to perform the lexical search, and the semantic search.

14. The non-transitory storage medium as recited in claim 11, wherein the sub-components of the lexical component comprise one or more lexical search parameters.

15. The non-transitory storage medium as recited in claim 11, wherein the sub-components of the semantic component comprise one or more semantic search parameters.

16. The non-transitory storage medium as recited in claim 11, wherein the HSS is unchanged notwithstanding replacement or modification of a search service used to perform the lexical search or the semantic search.

17. The non-transitory storage medium as recited in claim 11, wherein the aggregate results are returned to the user after the re-ranking is performed.

18. The non-transitory storage medium as recited in claim 11, wherein content corresponding to a portion of the aggregate results is retrieved and returned to the user.

19. The non-transitory storage medium as recited in claim 11, wherein content corresponding to a portion of the aggregate results comprises multimodal content.

20. The non-transitory storage medium as recited in claim 11, wherein the HSS is in a form of a single string.

* * * * *